(12) United States Patent
Constantinides et al.

(10) Patent No.: US 11,616,657 B2
(45) Date of Patent: Mar. 28, 2023

(54) VIRTUAL MEETING

(71) Applicant: Nokia Technologies Oy, Espoo (FI)

(72) Inventors: Marios Constantinides, Cambridge (GB); Ke Zhou, Cambridge (GB); Daniele Quercia, London (GB); Sagar Joglekar, Stevenage (GB)

(73) Assignee: NOKIA TECHNOLOGIES OY, Espoo (FI)

( * ) Notice: Subject to any disclaimer, the term of this patent is extended or adjusted under 35 U.S.C. 154(b) by 144 days.

(21) Appl. No.: 17/213,035

(22) Filed: Mar. 25, 2021

(65) Prior Publication Data
US 2021/0320811 A1 Oct. 14, 2021

(30) Foreign Application Priority Data

Apr. 9, 2020 (EP) .................................... 20168863

(51) Int. Cl.
*H04L 12/18* (2006.01)
*H04L 65/401* (2022.01)
*H04L 65/403* (2022.01)

(52) U.S. Cl.
CPC ...... *H04L 12/1831* (2013.01); *H04L 12/1822* (2013.01); *H04L 65/403* (2013.01); *H04L 65/4015* (2013.01)

(58) Field of Classification Search
CPC ............ H04L 12/1831; H04L 65/4015; H04L 12/1822; H04L 65/403
See application file for complete search history.

(56) References Cited

U.S. PATENT DOCUMENTS

| 5,572,728 A | 11/1996 | Tada et al. |
| 9,282,289 B2 | 3/2016 | Alexandrov et al. |
| 9,305,303 B2 * | 4/2016 | Farlie ................. G06Q 30/0203 |
| 2006/0171515 A1 | 8/2006 | Hintermeister et al. |
| 2007/0100939 A1 * | 5/2007 | Bagley .................. G06Q 10/10 |
| | | 709/204 |
| 2009/0138554 A1 | 5/2009 | Longobardi et al. |
| 2009/0249226 A1 * | 10/2009 | Manolescu ......... G06F 3/04815 |
| | | 715/757 |

(Continued)

FOREIGN PATENT DOCUMENTS

WO 2014/173370 A1 10/2014

OTHER PUBLICATIONS

"MeEthos: Supporting the Psychological Experience of Meetings", Proceedings of The ACM CHI Conference on Human Factors in Computing Systems, Apr. 25-30, 2020, 13 pages.

(Continued)

*Primary Examiner* — Nicholas R Taylor
*Assistant Examiner* — Tania M Pena-Santana
(74) *Attorney, Agent, or Firm* — Alston & Bird LLP

(57) ABSTRACT

An apparatus, method and computer program is described comprising: receiving a plurality of the interaction inputs for one or more of a plurality of time slices of a virtual meeting or presentation from one or more participants of the virtual meeting or presentation; determining one or more significant time slices of the virtual meeting or presentation based, at least partially, on one or more of the plurality of interaction inputs; and generating a summary of the virtual meeting or presentation, wherein the summary comprises audio data corresponding to at least some of the one or more significant time slices.

18 Claims, 9 Drawing Sheets

(56) References Cited

U.S. PATENT DOCUMENTS

| | | | | |
|---|---|---|---|---|
| 2011/0320044 | A1* | 12/2011 | Smith | G06F 3/04847 |
| | | | | 715/810 |
| 2013/0227025 | A1* | 8/2013 | Beerse | G06Q 10/00 |
| | | | | 709/204 |
| 2016/0034111 | A1 | 2/2016 | Sahai et al. | |
| 2016/0117624 | A1 | 4/2016 | Flores et al. | |
| 2016/0180361 | A1 | 6/2016 | Farlie | |
| 2016/0234268 | A1* | 8/2016 | Ouyang | H04L 67/54 |
| 2017/0214723 | A1 | 7/2017 | Sanso et al. | |
| 2017/0302709 | A1* | 10/2017 | Jones | G06Q 10/109 |
| 2019/0074987 | A1 | 3/2019 | Wiener et al. | |
| 2019/0189117 | A1* | 6/2019 | Kumar | H04L 51/02 |
| 2020/0403817 | A1* | 12/2020 | Daredia | H04L 12/1822 |
| 2021/0026500 | A1* | 1/2021 | Jain | G06Q 30/0245 |

OTHER PUBLICATIONS

Chiu et al., "NoteLook: Taking Notes in Meetings with Digital Video and Ink", Proceedings of the seventh ACM international conference on Multimedia (Part 1), Oct. 1999, pp. 149-158.

Girgensohn et al., "HyperMeeting: Supporting Asynchronous Meetings with Hypervideo", Proceedings of the 23rd ACM international conference on Multimedia, Oct. 2015, pp. 611-620.

Tucker et al., "Catchup: A Useful Application of Time-Travel in Meetings", Proceedings of the 2010 ACM conference on Computer supported cooperative work, Feb. 2010, pp. 99-102.

"IBM Watson Media Video Production", IBM, Retrieved on Mar. 24, 2021, Webpage available at: https://www.ibm.com/watson/media/highlights-clipping.

"The 6 Post-Event Survey Questions That Will Reveal Your Meeting's Effectiveness", MeetingsNet, Retrieved on Mar. 24, 2021, Webpage available at: https://www.meetingsnet.com/corporate-meetings/6-post-event-survey-questions-will-reveal-your-meetings-effectiveness.

"Executive Huddle's Meeting Effectiveness Evaluation", Survey Monkey, Retrieved on Mar. 24, 2021, Webpage available at: https://www.surveymonkey.com/r/LGMC99V.

"Redefining Promo & Sports Highlight Creation using AI", Prime Focus Technologies, Retrieved on Mar. 24, 2021, Webpage available at: https://www.primefocustechnologies.com/blog/redefining-promo-sports-highlight-creation-using-ai/?no_cache=1&fbclid=lwAR0kT3Kjuv5rscWtCb03m_AX4A6P906GLNC-EK6017Jp8gX-JhMvUOmlyb0.

"How to Watch your Nest Camera's Video History on a Computer", Google Nest Help, Retrieved on Mar. 24, 2021, Webpage available at: https://support.google.com/googlenest/answer/9225631?hl=en.

"Microsoft Build: Modern Meetings Demo", Youtube, Retrieved on Mar. 24, 2021, Webpage available at: https://www.youtube.com/watch?v=ddb3ZgAp9TA.

Robertson et al., "The Language of Dialogue Is Complex", Proceedings of the Thirteenth International AAAI Conference on Web and Social Media, 2019, pp. 428-439.

Axtell, "6 Reasons to Get Better at Leading Meetings", Harvard Business Review, Dec. 8, 2016, 4 pages.

Axtell, How to Design Meetings Your Team Will Want to Attend, Harvard Business Review, Apr. 5, 2017, 5 pages.

Axtell, "How to Respond When You're Put on the Spot in a Meeting", Harvard Business Review, Apr. 9, 2018, 2 pages.

Barksdale et al., "Video Threads: Asynchronous Video Sharing for Temporally Distributed Teams", Proceedings of the ACM 2012 conference on Computer Supported Cooperative Work, Feb. 2012, pp. 1101-1104.

Baumer, "Reflective Informatics: Conceptual Dimensions for Designing Technologies of Reflection", Proceedings of the 33rd Annual ACM Conference on Human Factors in Computing Systems, Apr. 2015, pp. 585-594.

Baumer et al., "Reviewing Reflection: On the Use of Reflection in Interactive System Design", Proceedings of the 2014 conference on Designing interactive systems, Jun. 2014, pp. 93-102.

Bergstrom et al., "Conversation Clusters: Grouping Conversation Topics Through Human-Computer Dialog", Proceedings of the SIGCHI Conference on Human Factors in Computing Systems, Apr. 2009, pp. 2349-2352.

Berni et al., "Effect of Vascular Risk Factors on Increase in Carotid and Femoral Intima-media Thickness. Identification of a Risk Scale", Atherosclerosis, vol. 216, May 2011, pp. 109-114.

Bostock et al., "$D^3$ Data-Driven Documents", IEEE Transactions on Visualization and Computer Graphics, vol. 17, No. 12, Dec. 2011, pp. 2301-2309.

Braun et al., "Using Thematic Analysis in Psychology", Qualitative Research in Psychology, vol. 3, No. 2, Jan. 2006, 41 pages.

Cattell, "The Scree Test for the Number of Factors", Multivariate Behavioral Research, vol. 1, No. 2, 1966, pp. 245-276.

Esbensen et al., "SideBar: Videoconferencing System Supporting Social Engagement", 10th IEEE International Conference on Collaborative Computing: Networking, Applications and Worksharing, Oct. 22-24, 2014, pp. 358-367.

Fabrigar et al., "Evaluating the Use of Exploratory Factor Analysis in Psychological Research", Psychological Methods, vol. 4, No. 3, 1999, pp. 272-299.

Fekete et al., "The Value of Information Visualization", Information Visualization, Lecture Notes in Computer Science, vol. 4950, Jul. 2008, pp. 1-18.

Froehlich et al., "UbiGreen: Investigating a Mobile Tool for Tracking and Supporting Green Transportation Habits", Proceedings of the SIGCHI Conference on Human Factors in Computing Systems, Apr. 2009, pp. 1043-1052.

Garcia et al., "Cutting to the Chase: Improving Meeting Effectiveness by Focusing on the Agenda", Proceedings of the 2004 ACM conference on Computer supported cooperative work, Nov. 2004, pp. 346-349.

Grenny, "How to Save a Meeting That's Gotten Tense", Harvard Business Review, Dec. 29, 2017, 2 pages.

Hayes et al., "One Click, Many Meanings: Interpreting Paralinguistic Digital Affordances in Social Media", Journal of Broadcasting & Electronic Media, vol. 60, No. 1, 2016, pp. 171-187.

Huang et al., "Personal Visualization and Personal Visual Analytics", IEEE Transactions on Visualization and Computer Graphics, vol. 21, No. 3, Mar. 2015, pp. 420-433.

Joinson, "Self-disclosure in Computer-mediated Communication: The Role of Self-awareness and Visual Anonymity", European Journal of Social Psychology, vol. 31, No. 2, Mar. 2001, pp. 177-192.

Kaiser, "The Application of Electronic Computers to Factor Analysis", Educational and Psychological Measurement, vol. 20, No. 1, 1960, pp. 141-151.

Kauffeld et al., "Meetings Matter: Effects of Team Meetings on Team and Organizational Success", Small Group Research, vol. 43, No. 2, 2012, pp. 130-158.

Kim et al., "Meeting Mediator: Enhancing Group Collaboration Using Sociometric Feedback", Proceedings of the 2008 ACM conference on Computer supported cooperative work, Nov. 2008, pp. 457-466.

Laplante, "What Every Engineer Should Know About Software Engineering", CRC Press, 2007, 300 pages.

Perlow et al., "Stop the Meeting Madness", Harvard Business Review, Jul.-Aug. 2017, 3 pages.

Li et al., "Understanding my Data, Myself: Supporting self-reflection with Ubicomp Technologies", Proceedings of the 13th international conference on Ubiquitous computing, Sep. 2011, pp. 405-414.

Lloret et al., "The Exploratory Factor Analysis of Items: Guided Analysis Based on Empirical Data and Software", Anales de Psicología, vol. 33, No. 2, 2017, pp. 417-432.

McEwan et al., "Supporting Social Worlds With the Community Bar", Proceedings of the 2005 international ACM SIGGROUP conference on Supporting group work, Nov. 2005, vol. 21-30.

McGregor et al., "More to Meetings: Challenges in Using Speech-based Technology to Support Meetings", Proceedings of the 2017 ACM Conference on Computer Supported Cooperative Work and Social Computing, Feb. 2017, pp. 2208-2220.

(56) References Cited

OTHER PUBLICATIONS

Mitchell, "Managing Complexity in Software Engineering", IEE Computing Series 17, 1990, 279 pages.

Niemantsverdriet et al., "Recurring Meetings: An Experiential Account of Repeating Meetings in a Large Organization", Proceedings of the ACM on Human-Computer Interaction, Article: 84, Dec. 2017, pp. 84:1-84:17.

Pohl et al., "Focused and Casual Interactions: Allowing Users to Vary Their Level of Engagement", Proceedings of the SIGCHI Conference on Human Factors in Computing Systems, Apr. 2013, pp. 2223-2232.

Pousman et al., "Casual Information Visualization: Depictions of Data in Everyday Life", IEEE Transactions on Visualization and Computer Graphics, vol. 13, No. 6, Nov.-Dec. 2007, pp. 1145-1152.

Rogelberg et al., "Wasted Time and Money in Meetings: Increasing Return on Investment", Small Group Research, vol. 43, No. 2, Apr. 2012, pp. 236-245.

Romero et al., "A Field Study of Community Bar: (Mis)-matches Between Theory and Practice", Proceedings of the 2007 international ACM conference on Supporting group work, Nov. 2007, pp. 89-98.

"America Meets a lot. An Analysis of meeting length, frequency and cost", Attentiv, Retrieved on Mar. 25, 2021, Webpage available at: http://attentiv.com/america-meets-a-lot/.

Tang et al., "Time Travel Proxy: Using Lightweight Video Recordings to Create Asynchronous, Interactive Meetings", Proceedings of the SIGCHI Conference on Human Factors in Computing Systems, 2012, pp. 3111-3120.

Tat et al., "Visualising Human Dialog", Proceedings Sixth International Conference on Information Visualisation, Jul. 10-12, 2002, 6 pages.

Tat et al., "CrystalChat: Visualizing Personal Chat History", Proceedings of the 39th Annual Hawaii International Conference on System Sciences (HICSS'06), Jan. 4-7, 2006, pp. 1-10.

Moere et al., "Visualising the Social Dynamics of Team Collaboration", CoDesign, vol. 4, No. 3, Sep. 2008, 20 pages.

Vronay et al., "Alternative Interfaces for Chat", Proceedings of the 12th annual ACM symposium on User interface software and technology, Nov. 1999, pp. 19-26.

Woolley et al., "Evidence for a Collective Intelligence Factor in the Performance of Human Groups", Science, vol. 330, Oct. 2010, pp. 686-688.

Extended European Search Report received for corresponding European Patent Application No. 20168863.7, dated Aug. 13, 2020, 6 pages.

Kard et al., "Readings in Information Visualization: Using Vision to Think", dblp, Morgan Kaufmann Publishers Inc, Jan. 1999, 14 pages.

Office Action for European Application No. 20168863.7 dated Aug. 5, 2022, 6 pages.

\* cited by examiner

VIRTUAL MEETING

FIELD

The present specification relates to virtual meetings or presentations, such as virtual meetings or presentation having a plurality of participants.

BACKGROUND

Virtual meetings or presentations are known. There remains a need for further improvements related to interaction and involvement between participants of virtual meetings or presentations.

SUMMARY

In a first aspect, this specification provides an apparatus comprising means for performing: receiving a plurality of interaction inputs for one or more of a plurality of time slices of a virtual meeting or presentation from one or more participants of the virtual meeting or presentation; determining one or more significant time slices of the virtual meeting or presentation based, at least partially, on one or more of the plurality of interaction inputs; and generating a summary of the virtual meeting or presentation, wherein the summary comprises audio data corresponding to at least one of the one or more significant time slices.

In some examples, determining the one or more significant time slices is based, at least partially, on whether a number of received interaction inputs for a respective time slice is above a first threshold.

Some examples include means for performing: generating the audio data corresponding to the one or more significant time slices when the number of interaction inputs for the respective one or more time slices is above a second threshold, wherein the second threshold is dependent on the first threshold.

In some examples, the first threshold is dependent on a total number of participants of the virtual meeting or presentation.

In some examples, the audio data comprises audio data for a time window starting before a significant time slice corresponding to the audio data and/or finishing after the significant time slice corresponding to the audio data.

Some examples include means for performing determining an empathy score and/or an integrative complexity score for at least some of the one or more significant time slices.

In some examples, the summary further comprises representations of the interaction inputs corresponding to the one or more significant time slices.

In some examples, the summary further comprises video data corresponding to at least some of the one or more significant time slices.

In some examples, the interaction inputs comprise one or more of: like, dislike, agree, disagree, and/or clarify inputs; comments from the one or more participants; answers from the one or more participants to one or more survey questions related to experience of the one or more participants during the virtual meeting; and/or inputs relating to environmental conditions experienced by a participant during the virtual meeting or presentation.

In some examples, the significant time slices may be a subset of the plurality of time slices of the virtual meeting or presentation.

The means may comprise: at least one processor; and at least one memory including computer program code, the at least one memory and the computer program code configured, with the at least one processor, to cause the performance of the apparatus.

In a second aspect, this specification provides an apparatus comprising means for performing: providing a plurality of interaction elements to enable a first participant participating in a virtual meeting or presentation to enter interaction inputs during the virtual meeting or presentation, wherein the virtual meeting or presentation comprises one or more participants; providing, to the first participant, visual representations of a plurality of interaction inputs entered by the one or more participants for one or more selected time slices of the virtual meeting or presentation; and providing, to the first participant, a summary of the virtual meeting or presentation, wherein the summary comprises at least audio data corresponding to at least some of one or more significant time slices, wherein the one or more significant time slices are determined based, at least partially, on one or more of the plurality of interaction inputs.

In some examples, the one or more selected time slices are selected based on a current time or are selected based on one or more respective timeline inputs from the first participant.

In some examples, the summary further comprises representations of the interaction inputs corresponding to the one or more significant time slices.

In some examples, the summary further comprises video data corresponding to at least some of the one or more significant time slices.

In some examples, the interaction inputs comprise one or more of: like, dislike, agree, disagree, and/or clarify inputs; comments from the one or more participants; answers from the one or more participants to one or more survey questions related to experience of the one or more participants during the virtual meeting; and/or inputs relating to environmental conditions experienced by a participant during the virtual meeting or presentation.

In some examples, the significant time slices may be a subset of a plurality of time slices of the virtual meeting or presentation.

The means may comprise: at least one processor; and at least one memory including computer program code, the at least one memory and the computer program code configured, with the at least one processor, to cause the performance of the apparatus.

In a third aspect, this specification describes a method comprising: receiving a plurality of the interaction inputs for one or more of a plurality of time slices of a virtual meeting or presentation from one or more participants of the virtual meeting or presentation; determining one or more significant time slices of the virtual meeting or presentation based, at least partially, on one or more of the plurality of interaction inputs; and generating a summary of the virtual meeting or presentation, wherein the summary comprises audio data corresponding to at least some of the one or more significant time slices.

In some examples, determining the one or more significant time slices is based, at least partially, on whether a number of received interaction inputs for a respective time slice is above a first threshold.

Some examples may further comprise performing generating the audio data corresponding to the one or more significant time slices when the number of interaction inputs for the respective one or more time slices is above a second threshold, wherein the second threshold is dependent on the first threshold.

In some examples, the first threshold is dependent on a total number of participants of the virtual meeting or presentation.

In some examples, the audio data comprises audio data for a time window starting before a significant time slice corresponding to the audio data and/or finishing after the significant time slice corresponding to the audio data.

Some examples may further comprise performing determining an empathy score and/or an integrative complexity score for at least some of the one or more significant time slices.

In some examples, the summary further comprises representations of the interaction inputs corresponding to the one or more significant time slices.

In some examples, the summary further comprises video data corresponding to at least some of the one or more significant time slices.

In some examples, the interaction inputs comprise one or more of: like, dislike, agree, disagree, and/or clarify inputs; comments from the one or more participants; answers from the one or more participants to one or more survey questions related to experience of the one or more participants during the virtual meeting; and/or inputs relating to environmental conditions experienced by a participant during the virtual meeting or presentation.

In some examples, the significant time slices may be a subset of the plurality of time slices of the virtual meeting or presentation.

In a fourth aspect, this specification describes a method comprising: providing a plurality of interaction elements to enable a first participant participating in a virtual meeting or presentation to enter interaction inputs during the virtual meeting or presentation, wherein the virtual meeting or presentation comprises one or more participants; providing, to the first participant, visual representations of a plurality of interaction inputs entered by the one or more participants for one or more selected time slices of the virtual meeting or presentation; and providing, to the first participant, a summary of the virtual meeting or presentation, wherein the summary comprises at least audio data corresponding to at least some of one or more significant time slices.

In some examples, the one or more selected time slices are selected based on a current time or are selected based on one or more respective timeline inputs from the first participant.

In some examples, the summary further comprises representations of the interaction inputs corresponding to the one or more significant time slices.

In some examples, the summary further comprises video data corresponding to at least some of the one or more significant time slices.

In some examples, the interaction inputs comprise one or more of: like, dislike, agree, disagree, and/or clarify inputs; comments from the one or more participants; answers from the one or more participants to one or more survey questions related to experience of the one or more participants during the virtual meeting; and/or inputs relating to environmental conditions experienced by a participant during the virtual meeting or presentation.

In some examples, the significant time slices may be a subset of a plurality of time slices of the virtual meeting or presentation.

In a fifth aspect, this specification describes an apparatus configured to perform any method as described with reference to the third or fourth aspects.

In a sixth aspect, this specification describes computer-readable instructions which, when executed by computing apparatus, cause the computing apparatus to perform any method as described with reference to the third or fourth aspects.

In a seventh aspect, this specification describes a computer program comprising instructions for causing an apparatus to perform at least the following: receiving a plurality of the interaction inputs for one or more of a plurality of time slices of a virtual meeting or presentation from one or more participants of the virtual meeting or presentation; determining one or more significant time slices of the virtual meeting or presentation based, at least partially, on one or more of the plurality of interaction inputs; and generating a summary of the virtual meeting or presentation, wherein the summary comprises audio data corresponding to at least some of the one or more significant time slices.

In an eighth aspect, this specification describes a computer program comprising instructions for causing an apparatus to perform at least the following: providing a plurality of interaction elements to enable a first participant participating in a virtual meeting or presentation to enter interaction inputs during the virtual meeting or presentation, wherein the virtual meeting or presentation comprises one or more participants; providing, to the first participant, visual representations of a plurality of interaction inputs entered by the one or more participants for one or more selected time slices of the virtual meeting or presentation; and providing, to the first participant, a summary of the virtual meeting or presentation, wherein the summary comprises at least audio data corresponding to at least some of one or more significant time slices.

In a ninth aspect, this specification describes a computer-readable medium (such as a non-transitory computer-readable medium) comprising program instructions stored thereon for performing (at least) any method as described with reference to the third or fourth aspects.

In a tenth aspect, this specification describes an apparatus comprising: at least one processor; and at least one memory including computer program code which, when executed by the at least one processor, causes the apparatus to perform (at least) any method as described with reference to the third or fourth aspects.

In an eleventh aspect, this specification describes an apparatus comprising: a first module configured to receive a plurality of the interaction inputs for one or more of a plurality of time slices of a virtual meeting or presentation from one or more participants of the virtual meeting or presentation; a second module configured to determine one or more significant time slices of the virtual meeting or presentation based, at least partially, on one or more of the plurality of interaction inputs; and a third module configured to generate a summary of the virtual meeting or presentation, wherein the summary comprises audio data corresponding to at least some of the one or more significant time slices.

In a twelfth aspect, this specification describes an apparatus comprising: a fourth module configured to provide a plurality of interaction elements to enable a first participant participating in a virtual meeting or presentation to enter interaction inputs during the virtual meeting or presentation, wherein the virtual meeting or presentation comprises one or more participants; a fifth module configured provide, to the first participant, visual representations of a plurality of interaction inputs entered by the one or more participants for one or more selected time slices of the virtual meeting or presentation; and a sixth module configured to provide, to the first participant, a summary of the virtual meeting or presentation, wherein the summary comprises at least audio data corresponding to at least some of one or more significant time slices.

BRIEF DESCRIPTION OF THE DRAWINGS

Example embodiments will now be described, by way of non-limiting examples, with reference to the following schematic drawings, in which.

DETAILED DESCRIPTION

Figure 1:
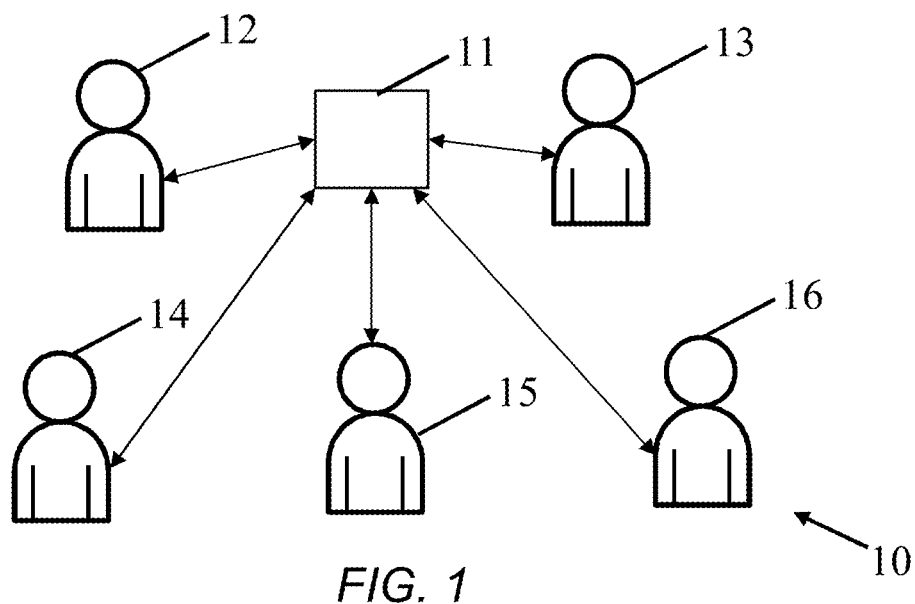
FIG. 1 is a block diagram of a system in accordance with an example embodiment.

The scope of protection sought for various embodiments of the invention is set out by the independent claims. The embodiments and features, if any, described in the specification that do not fall under the scope of the independent claims are to be interpreted as examples useful for understanding various embodiments of the invention.

In the description and drawings, like reference numerals refer to like elements throughout.

FIG. 1 is a block diagram of a system, indicated generally by the reference numeral 10, in accordance with an example embodiment. System 10 comprises a plurality of participants 12 to 16 participating in a virtual meeting or presentation, for example, using a module 11. For example, the module 11 may be a server (e.g. for a video-conferencing tool) for enabling communication between the plurality of participants 12 to 16. One or more of the plurality of participants 12 to 16 may be a host of the virtual meeting or presentation and one of more of the other participants may be attendees of the virtual meeting or presentation. The plurality of participants 12 to 16 may communicate by sending and/or receiving audio data through the module 11 and/or by sending and/or receiving video data through the module 11.

In virtual meetings, participants might feel less involved, for example, due to psychological experience of meetings not being understood as effectively as in in-person meetings (e.g. comprising communication channels through facial expressions, humour, voice tone etc., which may be lacking in virtual meetings or presentations). Some example embodiments presented herewith allow capturing significant moment(s) of a virtual meeting or presentation, and may further allow more effective communication, for example, by allowing participants to feel more involved in the meeting.

Figure 2:
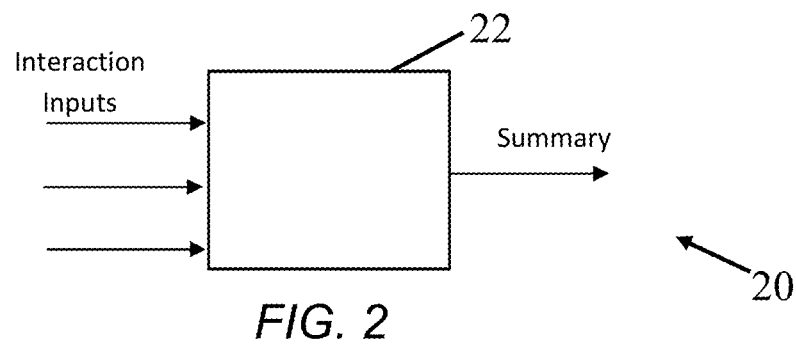
FIG. 2 is a block diagram of a system in accordance with an example embodiment.

FIG. 2 is a block diagram of a system, indicated generally by a reference numeral 20, in accordance with an example embodiment. System 20 comprises a first module 22 that is configured to receive a plurality of interaction inputs and to generate a summary. For example, the first module 22 may be a server (e.g. a server for a video conferencing tool, similar to module 11) for a virtual meeting or presentation. The first module 22 may receive the plurality of interaction inputs from one or more participants (e.g. one or more of the participants 12 to 16). The first module 22 may generate a summary of the virtual meeting or presentation based, at least in part, on the interaction inputs.

Figure 3:
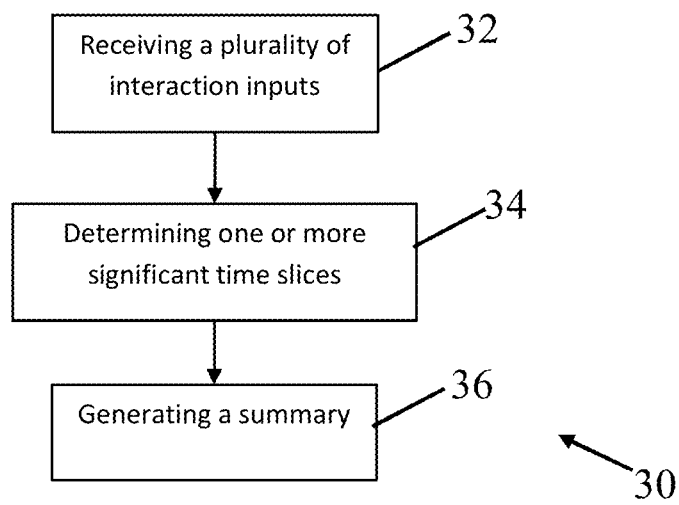
FIGS. 3 and 4 are flow charts of algorithms in accordance with example embodiments.

FIG. 3 is a flow chart of an algorithm, indicated generally by a reference numeral 30, in accordance with an example embodiment.

At operation 32, a plurality of interaction inputs may be received (e.g. by the first module 22) for one or more of a plurality of time slices of a virtual meeting or presentation from one or more participants (e.g. one or more of the participants 12 to 16) of the virtual meeting or presentation. A time slice of the virtual meeting or presentation may indicate a part (e.g. audio part and/or video part) of the virtual meeting or presentation, for example, generated by segmentation of the audio and/or video with respect to time. In one example, the video may comprise visual data such as screen sharing, images of participants or the like. The plurality of interaction inputs may comprise inputs that may describe or may provide an indication of the experience of the one or more participants participating in the virtual meeting or presentation. Example interaction inputs are described in further detail below with reference to FIG. 5.

At operation 34, the first module 22 may determine one or more significant time slices of the virtual meeting or presentation based, at least partially, on one or more of the plurality of interaction inputs. The one or more significant time slices of the virtual meeting or presentation may represent one or more significant or memorable moments, for example, the parts of the meeting or presentation that got the most attention from the participants, contained the most important point(s), needed more clarification, was most liked, agreed, disliked, or disagreed by the participants, or the like. In an example embodiment, determining the one or more significant time slices is based, at least partially, on whether a number of received interaction inputs for a respective time slice is above a first threshold. For example, the first threshold may be dependent on (e.g. a percentage of) a total number of participants of the virtual meeting or presentation. For example, the first threshold may be defined to be 60% of the total number of participants. If there are five participants (e.g. participants 12 to 16), a time slice may be determined to be a significant time slice if the number of interaction inputs received for the time slice is at least three (60% of 5). In another example, if there are ten participants, a time slice may be determined to be a significant time slice if the number of interaction inputs received for the time slice is at least six (60% of 10). The significant time slices may be a subset of the plurality of time slices of the virtual meeting or presentation.

At operation 36, a summary of the virtual meeting or presentation is generated. The summary may comprise audio data (e.g. audio snippets comprising short audio recordings taken from a recording of the meeting or presentation) corresponding to at least one of the one or more significant time slices. In an example embodiment, the summary may further comprise representations of the interaction inputs corresponding to the one or more significant time slices. In an example embodiment, the summary may further comprise image and/or video data corresponding to at least some of the one or more significant time slices.

Figure 4:
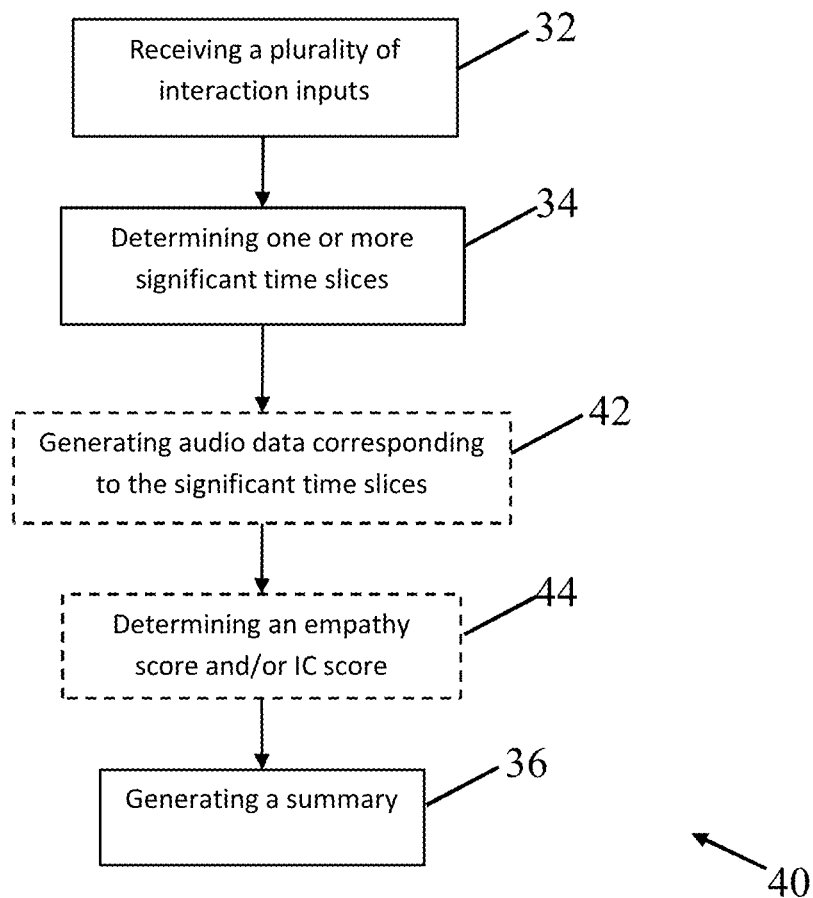

FIG. 4 is a flow chart of an algorithm, indicated generally by the reference numeral 40, in accordance with an example embodiment. The algorithm 40 comprises operations 32, 34 and 36, as described above with reference to FIG. 3. Operations 42 and 44 may optionally be performed in addition to the operations 32, 34, and 36, as discussed further below.

At operation 42, audio data corresponding to the one or more significant time slices determined in operation 34 may be generated, for example when the number of interaction inputs for the respective one or more time slices reaches above a second threshold. The second threshold may be dependent on the first threshold and may, for example, be a percentage of the total number of participants.

For example, the audio data may be generated during the virtual meeting and/or presentation (e.g. the virtual meeting or presentation is ongoing). The interaction inputs may be received during the virtual meeting or presentation (e.g. for respective time slices of the virtual meeting or presentation), such that when the number of interaction inputs for a respective time slice reach or exceed the second threshold (e.g. the second threshold may be less than or more than the first threshold), audio data corresponding to the respective time slice may be generated. The respective time slice may be a significant time slice if the interaction inputs for the respective time slices is above the first threshold.

For example, the second threshold may be higher than, lower than, or same as the first threshold. For example, the first threshold may be defined to be 60% of the total number of participants, such that, when there are 10 participants, a time slice may be determined to be a significant time slice if the number of interaction inputs received for the time slice is at least 6 (60% of 10, first threshold). The second threshold may be defined to be 70% (higher than the first threshold) such that audio data for the time slice is generated when the number of interaction inputs received for the time slice reaches 7 (70% of 10, second threshold). As such, even if the time slice is determined to be a significant time slice, audio data for the time slice may not be generated unless the interaction inputs reaches the second threshold. Alternatively, the second threshold may be defined to be 50% (lower than the first threshold), such that the audio data for the time slice is generated when the number of interaction inputs received for the time slice reaches 5 (50% of 10, second threshold). As such, the audio data may be generated before the time slice is determined to be a significant time slice or even if the time slice is not determined to be a significant time slice. Alternatively, the second threshold may be defined to be 60% (same as the first threshold), such that the audio data for the time slice is generated when the number of interaction inputs received for the time slice reaches 6 (60% of 10, second threshold). As such, the audio data for the time slice may be generated when the time slice is determined to be a significant time slice.

In an example embodiment, the audio data may comprise audio data for a time window starting before the corresponding significant time slice and/or finishing after the corresponding significant time slice. For example, this may allow the audio data (e.g. an audio snippet of the significant time slice) to include a context of what was spoken and/or shown in the meeting or presentation before and/or after the significant time slice (e.g. so that the audio data does not start or stop abruptly in the middle of a topic of discussion).

At operation 44, an empathy score and/or integrative complexity score may be determined for at least one of the one or more significant time slices of the virtual meeting or presentation. For example, the empathy score and/or integrative complexity score may be determined using one or more machine learning models (e.g. by transcribing the audio data using a speech to text application or service). The empathy score may relate to the ability of a participant to correlate with and gain an accurate understanding of other participants' emotional states. During meetings or presentations, the empathy score may indicate a speaker's ability to understand how people are responding to them, and the Integrative Complexity (IC) score may indicate the ability of the speaker to recognize different perspectives of the other participants and/or connect with them (e.g. enabling the speaker to identify paths for conflict resolution). The IC score may also help participants of the meeting or presentation to identify conflicts and assess whether the speaker can recognize and connect to those multiple views. The empathy score and IC score may be related and may be linearly combined into a normalized combined score (e.g. the combined score may be displayed in the summary of the virtual meeting or presentation). Machine learning models (e.g. XGBoost) for determining empathy and IC scores may be trained based on natural language processing (NLP) algorithms with various syntactic and semantic features derived from texts (e.g. text obtained from transcribing the audio data). The semantic features may include the actual words or phrases, and the classes of words in terms of their meaning, such as the emotion the words convey. The syntactic features may include properties related to the way the language is meaningfully structured, such as part of speech of the word (noun or adjective). The machine learning models may be trained with generic ground-truth data. For example, the IC model may achieve a competitive F1 score of 0.45 for a 7-class classification problem.

Figure 5:
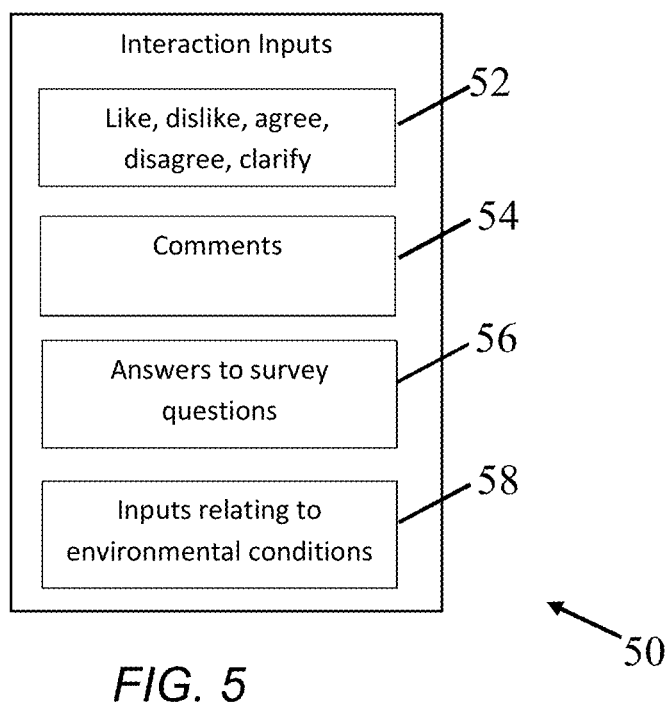
FIG. 5 is a block diagram of a system in accordance with an example embodiment.

FIG. 5 is a block diagram of a system, indicated generally by the reference numeral 50, in accordance with an example embodiment. As described above, a plurality of interaction inputs may be received for one or more of a plurality of time slices of the virtual meeting or presentation. The interaction inputs may comprise one or more of interaction inputs 52, 54, 56, and/or 58. Interaction inputs 52 may relate to like, dislike, agree, disagree, or clarify inputs from the one or more participants. For example, if a participant likes the part of the meeting corresponding to the respective time slice, they may send a 'like' interaction input, or if they need further clarification, they may send a 'clarify' interaction input. Interaction inputs 54 may comprise comments from the one or more participants. The interaction inputs 54 may further comprise upvotes (e.g. like, agree) or downvotes (e.g. dislike, disagree) of existing comments, such that participants can like, agree, dislike or disagree with comments from other participants. Further, if a participant has a comment similar to an existing comment from another participant, the participant may simply upvote the existing comment instead of submitting another similar comment. Interaction inputs 56 may comprise answers from the one or more participants to one or more survey questions related to experience of the one or more participants during the virtual meeting (e.g. 'did you feel involved in the meeting', 'was the purpose of the meeting clear', etc.). Interaction inputs 58 may comprise inputs relating to environmental conditions experienced by a participant during the virtual meeting or presentation (e.g. air quality, room temperature, etc.). The interaction inputs may further comprise automatic recognition of the one or more participants liking, disliking, agreeing, disagreeing, or needing clarification, for example by facial recognition, voice recognition (e.g. tone of voice), or the like. The interaction inputs of the system 50 are provided by way of example only; many variants are possible.

Figure 6:
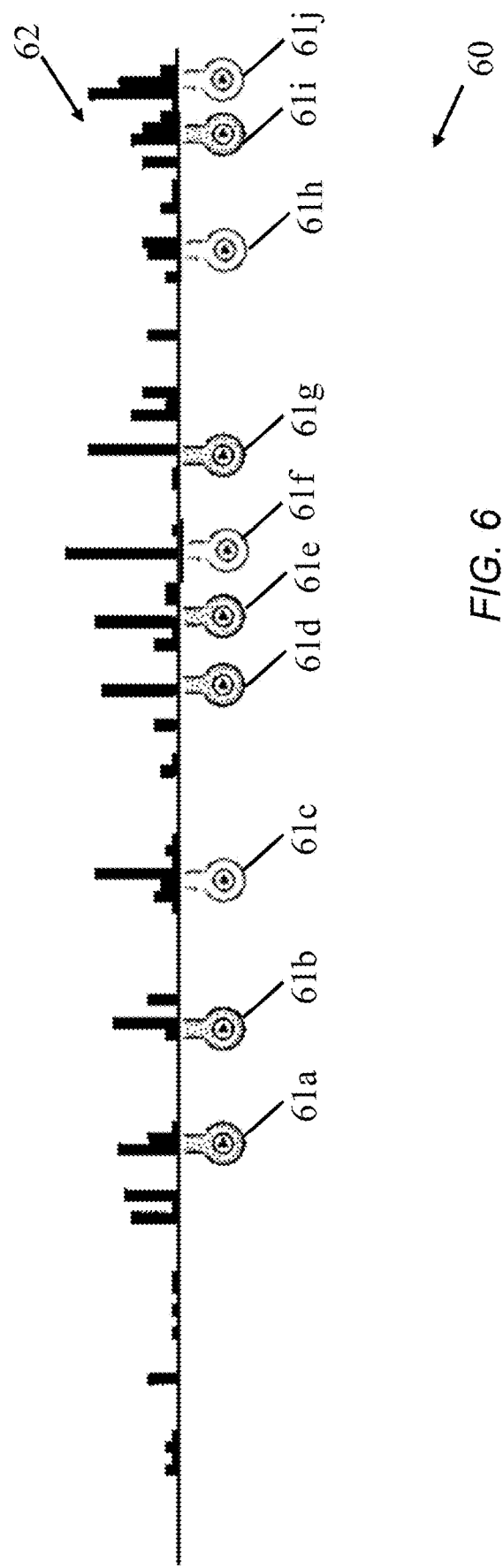
FIGS. 6 and 7 are block diagrams of a summary in accordance with an example embodiment.

FIG. 6 is a block diagram of a summary, indicated generally by the reference numeral 60, in accordance with an example embodiment. The summary 60 may be a visual representation of a summary of the virtual meeting or presentation, for example, as generated in the operation 36. Summary 60 may comprise audio data 61, and may optionally comprise visual representations of interaction inputs 62. For example the summary 60 may be represented as a timeline comprising a plurality of time slices of the virtual meeting or presentation. The audio data 61 may be represented in audio data representations 61*a* to 61*j* (e.g. visual or graphical representations) arranged corresponding to the time slices, such that the audio data representations 61*a* to 61*j* may be selected (e.g. clicked, touched, or otherwise interacted with) in order to play the audio data corresponding to the respective time slice where the visual representations are arranged. In one example, the summary 60 only comprises audio data for significant time slices (e.g. time slices with interaction inputs higher than a first threshold, as determined, for example, in operation 34). For example, the interaction inputs 62 show that the number of interaction inputs for time slices corresponding to the audio data representations 61*a* to 61*j* are higher than the interaction inputs for other time slices, thus determining the time slices to be significant time slices. The summary is described in further detail below with reference to FIG. 7.

Figure 7:
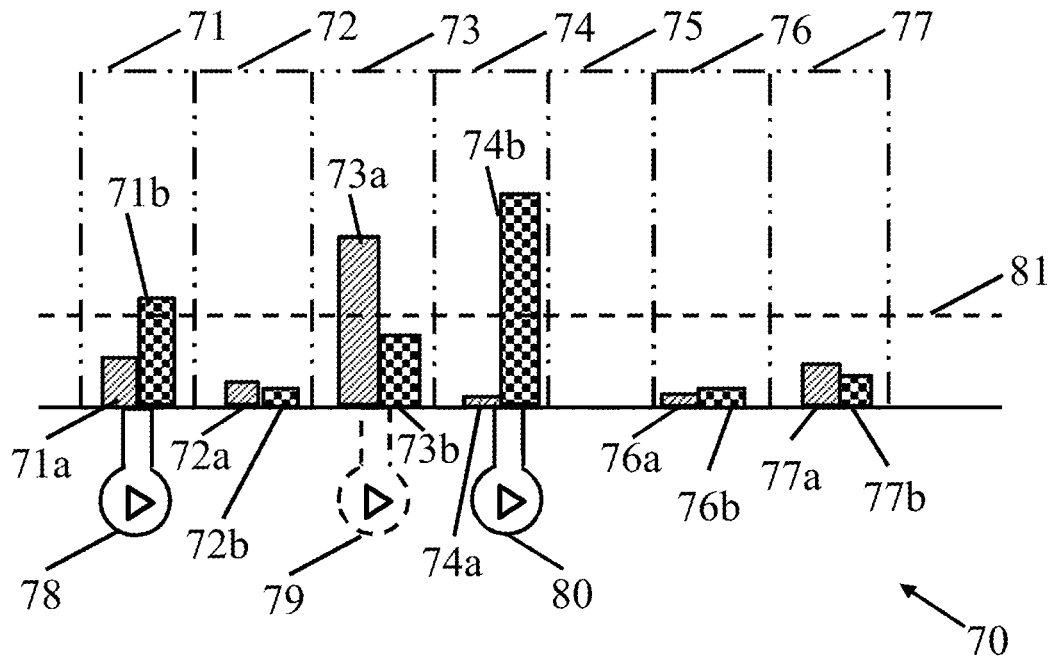

FIG. 7 is a block diagram of a summary, indicated generally by the reference numeral 70, in accordance with an example embodiment. The summary 70 comprises a visual representation of the summary (e.g. generated at operation 36) of the virtual meeting or presentation comprising a plurality of time slices 71 to 77, which summary comprises audio data representations 78, 79, and 80 for one or more significant time slices.

The summary may optionally further comprise visual representations of interaction inputs 71*a*, 71*b*, 72*a*, 72*b*, 73*a*, 73*b*, 74*a*, 74*b*, 76*a*, 76*b*, 77*a*, and 77*b* corresponding to time slices 71 to 77 respectively. As described above, the interaction inputs may relate to one or more of like, dislike, agree, disagree, or clarify inputs. In the summary 70, for example, the interaction inputs 71*a* to 77*a*, shown in a striped pattern, may relate to 'like' inputs, and the interaction inputs 71*b* to 77*b*, shown in chequered pattern, may relate to 'clarify' inputs. If no interaction inputs are received for any one or more times slices, those time slices may appear blank, such as time slice 75 in the summary 70.

The summary 70 may further show a first threshold 81, shown by a dashed line. For example, if the interaction inputs for a time slice reaches or exceeds the first threshold 81, the time slice may be determined to be a significant time slice. As the number of interaction inputs (e.g. number of 'like' inputs, number of 'clarify' inputs, or total number of 'like' and 'clarify' inputs) for the time slices 71, 73, and 74 are higher than the threshold 81, the time slices 71, 73, and 74 may be determined to be significant time slices. As such, the summary 70 comprises audio data represented by audio data representations 78, 79, and 80 for the time slices 71, 73, and 74 respectively. In one example, the audio data (represented by audio data representations 78, 79, and/or 80) may comprise audio data for a time window starting before the corresponding significant time slice (e.g. 71, 73, and/or 74) and/or finishing after the corresponding significant time slice (e.g. 71, 73, and/or 74).

In an example embodiment, the summary 70 may further comprise an indication of empathy score and/or IC score for one or more significant time slices. For example, the empathy score and/or IC score for the significant time slices 71 and 74 may be higher than an empathy threshold, and this may be indicated by the audio data representation 78 and 80 having a solid line. Similarly, the empathy score and/or IC score for the significant time slice 73 may be lower than the empathy threshold, and this may be indicated by the audio data representation 79 having a dashed line.

Figure 8:
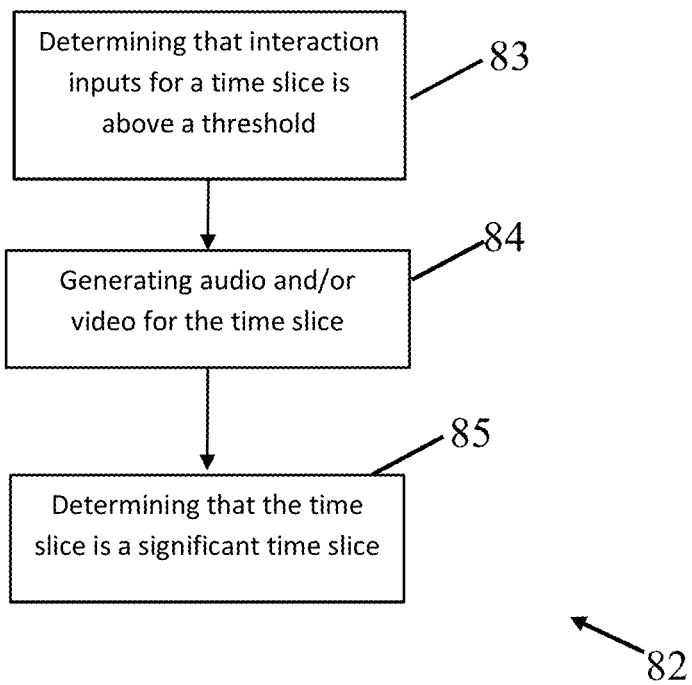
FIGS. 8 and 9 are flow charts of algorithms in accordance with example embodiments.

FIG. 8 is a flowchart of an algorithm, indicated generally by the reference numeral 82, in accordance with an example embodiment. At operation 83, it is determined that the interaction inputs for a time slice (e.g. one of time slices 71 to 77) is above a first threshold (e.g. first threshold 81). At operation 84, audio and/or video data may be generated for the time slice. At operation 85, the time slice is determined to be a significant time slice (e.g. time slices 71, 73, and 74).

Figures 9, 10:
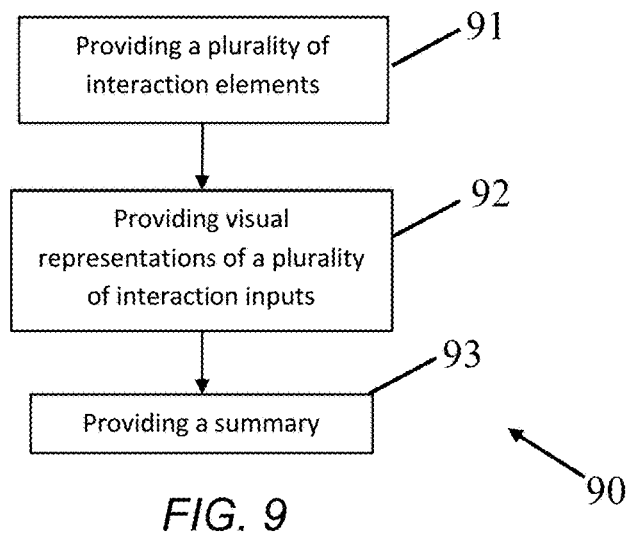
FIG. 10 is a block diagram of a display in accordance with an example embodiment.

FIG. 9 is a flowchart of an algorithm, indicated generally by the reference numeral 90, in accordance with an example embodiment. For example, the operations of algorithm 90 may be performed at a client side application. At operation 91, a plurality of interaction elements may be provided to enable a first participant participating in a virtual meeting or presentation to enter interaction inputs (e.g. received by the first module 22 at operation 32) during the virtual meeting or presentation. The virtual meeting or presentation may comprise one or more participants. At operation 92, visual representations of a plurality of interaction inputs may be provided to the first participant. The plurality of interaction inputs may be entered by the one or more participants for one or more selected time slices of the virtual meeting or presentation. At operation 93, a summary (e.g. as generated by the first module 22 at operation 36) of the virtual meeting or presentation may be provided to the first participant. As described above, the summary may comprise at least audio data corresponding to at least some of one or more significant time slices, and the one or more significant time slices may be determined based, at least partially, on one or more of the plurality of interaction inputs. In one example, the one or more selected time slices are selected based on a current time or are selected based on one or more respective timeline inputs from the first participant (explained in further detail below). The summary may be provided at the end of the meeting or presentation.

FIG. 10 is a block diagram of a display (e.g. a user interface), indicated generally by the reference numeral 100, in accordance with an example embodiment. The display 100 shows a number of interaction elements, which may comprise one or more of interaction elements 101, 102, 103, and/or 104. For example, one or more of the interaction elements 101 to 104 may be provided, at operation 91 of the algorithm 90, to enable the first participant to enter interaction inputs during the virtual meeting or presentation. One or more of the interaction elements 101 to 104 may be provided one by one, or may be provided together. Of course, the various interaction elements of the display 100 are provided by way of example only; many variants are possible.

For example, when the interaction element 101 is provided, the first participant may select (e.g. by clicking, touching, providing a voice input, or any other input) the 'like' input 101*a*, 'clarify' input 101*b*, 'agree' input 101*c*, 'disagree' input 101*d*, or the 'dislike' input 101*e* for a time slice (e.g. a current time slice) of the virtual meeting or presentation. In an example embodiment, an interactive feature of enabling participants to enter interaction inputs, such as the 'like' and 'clarify' inputs, may increase participants' emotional and social feelings of gratification. The participants may use this interactive feature to express their thoughts by tagging points during the meeting with a like/clarify reaction. The participants may enter the interaction inputs, for example, by clicking the "like" button during times when she liked or agreed with what the speaker is saying, or by clicking the "clarify" button during times when they feel unsure about what is being said.

When the interaction element 102 is provided, the first participant may report their room condition as fresh, okay, or stuffy by selecting the respective input. Based on the selection of the room condition, interaction input(s) relating to environmental conditions experienced by the first participant may be sent to the first module 22.

In an example embodiment, the participants may report their perception of the room's air quality. For example, when a participant feels that their room is pleasant, they may report that by choosing "fresh" among the options: "fresh", "ok-ish", or "stuffy". The reports may be visualized in visual representations 111 as a thermometer glyph alongside the attendees' emoji faces in the network visualization. For example, this could act as an immediate feedback for a meeting organizer to manually change the settings of the room temperature control (if any).

When the interaction element 103 is provided, the first participant may enter a comment regarding one or more time slices of the virtual meeting or presentation.

Although not shown in FIG. 10, the interaction element 103 may further enable the participants to upvote (e.g. like, agree) or downvote (e.g. dislike, disagree) existing comments, such that participants can like, agree, dislike or disagree with comments from other participants. Further, if a participant has a similar comment as an existing comment from another participant, the participant may simply upvote the existing comment instead of submitting another similar comment. In an example embodiment, the interaction inputs, such as the comments or upvotes of comments, may provide another channel for contribution. The participants may use the commenting feature in the user interface to submit comments or questions without interrupting the meeting, and the other participants may "upvote" or "downvote" comments.

When the interaction element 104 is provided, the first participant may provide answers to one or more survey questions related to experience of the first participant during the virtual meeting. For example, the first participant may select either 'agree' or 'disagree' for the first, second, and/or third survey questions such as (e.g. "Did you feel motivated to be involved in the meeting?", "Did the meeting have a clear purpose and structure?", and/or "Did the room feel pleasant?". It will be appreciated the interaction elements 101 may provide other kinds of inputs in addition to or instead of inputs 101a to 101e, and the interaction elements 104 may comprise other survey questions in addition to or instead of the first, second, and third survey questions.

Figure 11:
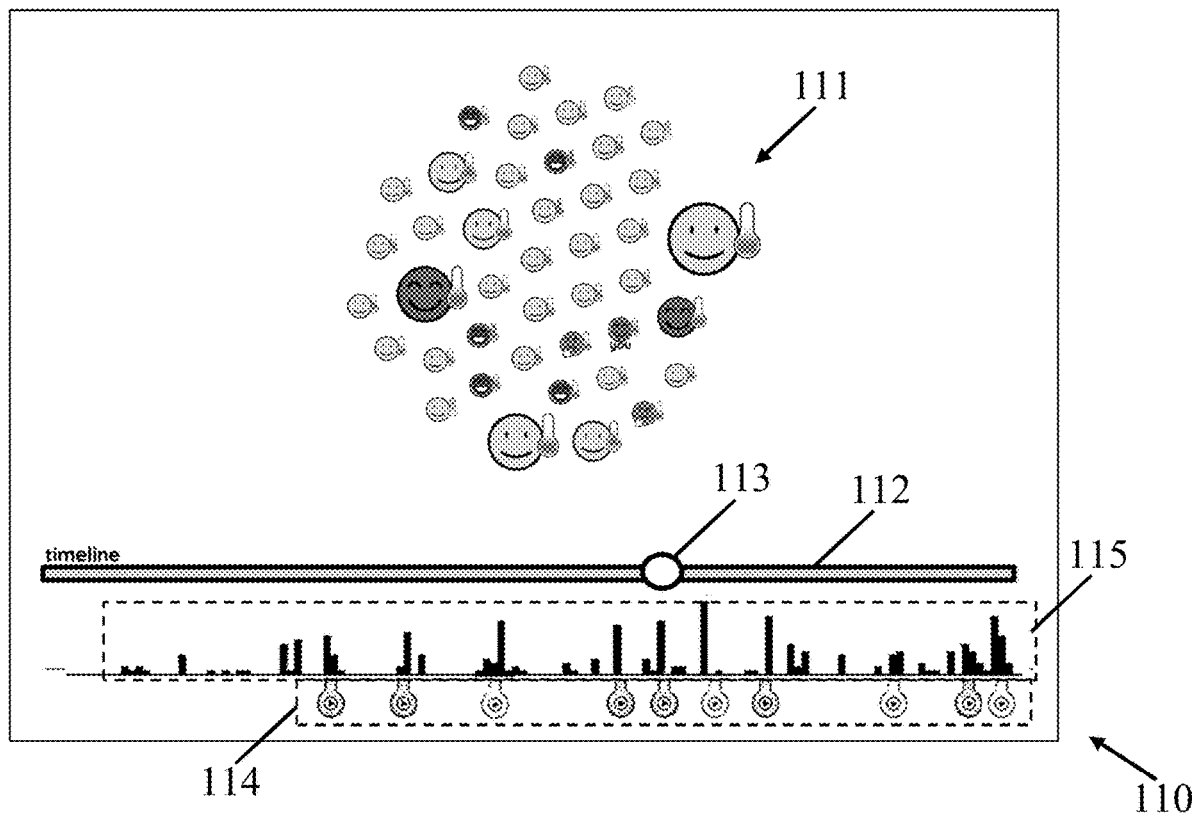
FIGS. 11 and 12 are block diagrams of visual representations in accordance with example embodiments.

FIG. 11 is a block diagram of visual representations, indicated generally by the reference numeral 110, in accordance with an example embodiment. The visual representations 110 may comprise a visual representation 111 of a plurality of interaction inputs entered by the one or more participants for one or more selected time slices of the virtual meeting or presentation. The visual representations 110 may further comprise a summary of the virtual meeting or presentation, where the summary may comprise audio data representations 114 of one or more significant time slices, and an interaction input timeline 115. The interaction input timeline 115 may comprise representations of a plurality of interaction inputs received from a plurality of participants for the plurality of time slices of the virtual meeting or presentation.

The visual representations 110 may further comprise a timeline 112 and a timeline input 113. The timeline input 113 may be used for selecting a time slice. For example, the timeline input 113 may be controlled relative to the timeline 112 (e.g. by sliding the timeline input 113 across the timeline 112) to select a time slice. The visual representation 111 may then show a plurality of interaction inputs corresponding to the selected time slice. Alternatively, or in addition, the selected time slice may be a current time slice (e.g. current time during the virtual meeting or presentation), and thus the visual representation 111 may show a plurality of interaction inputs corresponding to the current time slice.

In an example embodiment, a summary page (e.g. comprising summary 70 shown in FIG. 7) is provided (e.g. via email) to the plurality of participants of the virtual meeting or. In the summary page, the participant may view a network visualization comprising the visual representations 111 and the timeline 112. Below the timeline 112, the bars in the interaction input timeline 115 may show the amount of interaction inputs (e.g. like, clarify inputs) sent by participants per minute (e.g. for each one minute time slice). When the amount of interaction inputs within a minute reach a certain threshold, an audio snippet may be generated and displayed in audio data representations 114. Audio snippets are short audio recordings taken from the whole recording of a meeting. As the audio snippets may be generated based on when the participants interacted (e.g. sent interaction inputs) during the meeting, the audio snippets may be an indication of memorable moments of a meeting or presentation. Generating audio data may require recording the audio of the meeting or presentation. The participants may be notified that the meeting or presentation is being recorded.

One or more participants (e.g. organizers, hosts, or speakers) of the meeting or presentation may choose not to record the meeting or presentation, or may choose not to record their speaking part of the meeting or presentation, which may cause the summary page to have no audio snippets, or have audio snippets of only some significant time slices. In one example, the summary may comprise audio snippets of a threshold number of significant time slices (e.g. top ten audio snippets corresponding to ten significant time slices with the highest number of interaction inputs). The number of audio snippets or audio data representations 114 and their lengths may be adapted according to different types of meetings or presentations or the preferences of one or more participants.

In an example embodiment, the visual representations 111 may comprise an emoji face representing each participant (e.g. anonymously) of the virtual meeting or presentation. For example, the expression on the emoji may indicate the experience of the respective participant, where the experience may be determined based on the various interaction inputs received from the participants. The size of the emoji may indicate the involvement of the participants, for example, the size may be bigger as the number of interaction inputs entered by the participant is higher. The emojis may further be accompanied by indications of the room conditions of the respective participants. In this way, the participants, and/or a speaker of the meeting or presentation may get an overview of the overall experience of the participants (e.g. how many people are interacting, which time slices or topics received most 'likes', which parts required more clarifications, etc.). This kind of overview may assist in improvement of subsequent meetings by analysing key strengths or weaknesses of the meeting or presentation.

Figure 12:
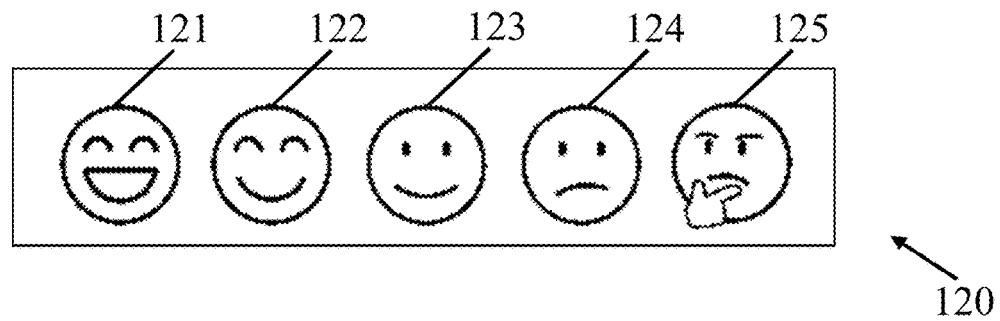

FIG. 12 is a block diagram of visual representations, indicated generally by the reference numeral 120, in accordance with an example embodiment. Visual representations 120 comprise emoji faces 121 to 125. For example, as described above, one of the emoji faces 121 to 125 may be used to represent each participant in the visual representations 111 to indicate the experience of the respective participant, where the experience may be determined based on the various interaction inputs received from the participants. For example, at the start of a meeting or presentation, the emoji 123 (e.g. a neutral expression) may be used for representing all participants. As a participant enters more 'like' or 'agree' inputs, the emoji for representing the participant may change from the emoji face 123 (e.g. neutral expression) to emoji face 122 (e.g. happy expression) or emoji face 121 (e.g. very happy expression). When a participant enters more 'disagree', 'dislike' or 'clarify' inputs, the emoji for representing the participant may change to emoji face 124 (e.g. confused or unhappy expression) or emoji face 125 (e.g. expression showing confusion or requiring clarification).

In an example embodiment, the survey questions (e.g. post meeting survey questions) described above may be used for capturing the psychological experiences of meeting. For example, the survey questions may be provided to the participants at the end of the meeting to understand the psychological status of the participants. The key questions may be determined (e.g. using principle component analysis) based on one or more elements that constitute people's psychological experience in meetings. For example, three key questions (e.g. meeting psychological experience questions (MPEQ)) may be determined as "Did you feel listened to during the meeting or motivated to be involved in it?", "Did the meeting have a clear purpose and structure, and did it result in a list of actionable points?", and "Did the room feel pleasant (in regards to air quality and crowdedness)?".

In an example embodiment, in addition to, or instead of providing the survey questions (e.g. post meeting survey questions) at the end of the meeting, one or more survey questions (e.g. pre-meeting survey questions) may be provided to the participants of the virtual meeting or presentation at the start of the meeting to understand the psychological status of the participants and/or how the participants usually feel in virtual meetings or presentations. For example, three key questions (e.g. related to meeting psychological experience questions (MPEQ)) may be determined as "Do you usually feel listened to during meetings and are you usually motivated to be involved in meetings?", "Do meetings usually have a clear purpose and structure, and do they usually result in a list of actionable points?", and "Does the room usually feel pleasant during meetings (in regards to air quality and crowdedness)?". After receiving answers from the participants for these survey questions, a set of engagement features (e.g. interaction elements 101 to 103) may be provided to the participants, which engagement features may capture and support the MPEQs and help the participants interacting with the meeting system, and sharing one's experience and opinions/questions along the meeting.

In one example, a user interface provided to the participants (e.g. the first participant) may comprise visual and interactive features. The visual features (e.g. summary of the meeting or presentation and visual representation of interaction inputs) may be user interface elements that portray information back to the participants through visual elements (i.e., output). The interactive features may be user interface elements that allow the participants to interact with (i.e., input) each other.

In an example embodiment, the first survey question related to engagement of the participants (e.g. "Did you feel listened to during the meeting or motivated to be involved in it?"), is concerned with increasing the participants' comfort and motivation to contribute which may impact how they perceive meetings. In order to improve the participants' motivation to contribute and engage in the meeting or presentation, a plurality of engagement features (as described earlier) may be used. The plurality of engagement features may comprise the provision of the interaction elements 101 (e.g. like, dislike, agree, disagree, clarify inputs) and 103 (e.g. comments and upvotes or downvotes of comments).

In an example embodiment, the second survey question (e.g. "Did the meeting have a clear purpose and structure, and did it result in a list of actionable points?") relates to ensuring that the participants understand the purpose of the meeting during and after the meeting. The participants' motivation to contribute and engage (e.g. related to first survey question) and the participants' understanding of the purpose of the meeting (e.g. related to second survey questions) may be improved using a plurality of visualization features. The plurality of visualization features may improve engagement by way of immediate (e.g. real-time) feedback (e.g. display of interaction inputs entered by other participants in visual representations 111), and may improve participants' understanding of the purpose of the meeting by way of post-meeting feedback (e.g. visual representation of the summary page). For example, the visual representations 111 may enable participants to understand how the meeting progresses with respect to the timeline 112. The timeline input 113 may be used for viewing the changes in participants' interactions over time. The audio snippets provided in audio data representations 114 of the summary page may allow the participants to reflect on the memorable moments of the meeting.

In an example embodiment, the third survey question related to environment of the participants ("Did the room feel pleasant (in regards to air quality and crowdedness)?") may enable the participants to report and change the air quality and crowdedness of meeting room(s) of one or more participants. This input may be received using automated sensors to detect the temperature and air quality of the room, and the room conditions may be changed by remotely controlling one or more devices in the rooms. The visual representations 111 may comprise the air quality reports (e.g. represented as thermometer glyphs) to provide immediate feedback, for example, to allow a meeting organizer to understand environmental conditions of the participants to be able to manually change the room conditions if necessary.

Figure 13:
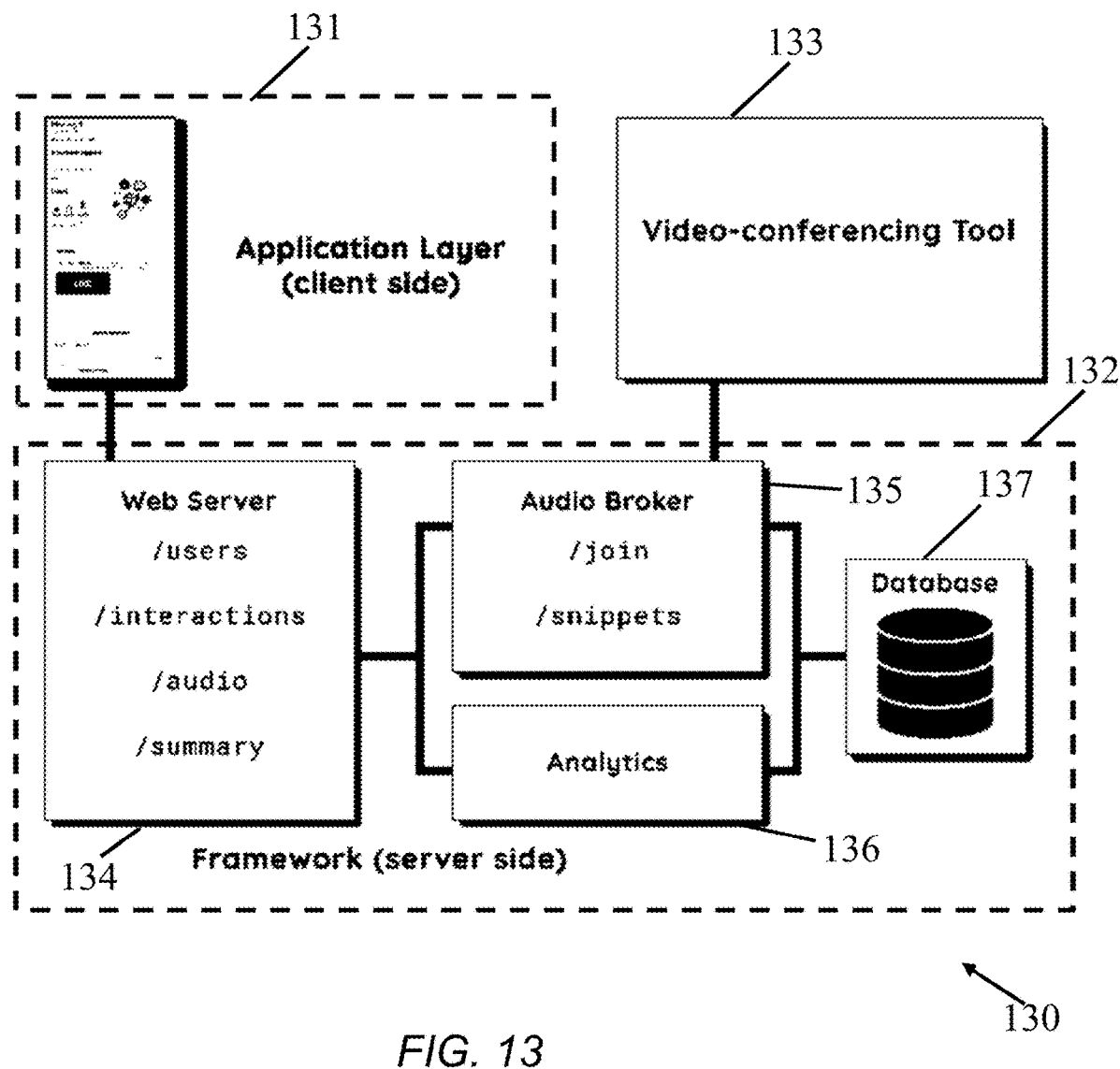
FIG. 13 is a block diagram of a system in accordance with an example embodiment.

FIG. 13 is a block diagram of a system, indicated generally by the reference numeral 130, in accordance with an example embodiment. System 130 comprises an application layer 131 (e.g. client side), a server side 132 (e.g. server side framework), and a video-conferencing tool 133. The server side framework 132 may comprise a web server 134, an audio broker server 135, an analytics module 136, and a database 137. The application layer 131 may comprise a user interface, for example, including a summary of the virtual meeting or presentation, and/or interaction elements provided to the participants to enable them to enter interaction inputs (e.g. which interaction inputs may be displayed and/or used for generating the summary) The web server 134 and audio broker server 135 may be part of a web services layer, and the database 137 may be part of a data access layer.

In an example embodiment, the server side 132 may be implemented as a three-tier architecture such that, for example, it may facilitate decoupling of the logic between different services (e.g. web server 134, audio broker server 135, and/or analytics module 136), and may allow scaling up of one or more services if required.

In an example embodiment, the application layer 131 may comprise a user interface that may comprise both visual and interactive features (e.g. implemented using HTML5/Javascript) in a seamless way.

In an example embodiment, the web server 134 may be implemented (e.g. using Python Tornado framework) to run continuously on the server side 132, and may use an application programming interface (e.g. REST API) to handle the communication with the application layer 131. The application programming interface may be used for managing users (/users), store and retrieve interactions (e.g. interaction inputs) with the user interface (/interactions), and generate summary pages (/audio and /summary) The communication between the user interface and the audio broker server 135 may be handled through endpoints of the web server 134.

In an example embodiment, the audio broker server 135 may be implemented (e.g. using Python Flask framework) to expose endpoints for recording (/join) and processing (/snippets) audio of the virtual meeting or presentation. The audio may be retrieved by the audio broker 135 from the video conferencing tool 133. For example, the recording of the audio of the virtual meeting or presentation may be performed using Twilio's communication API3. Twilio's API uses the Session Initiation Protocol (SIP) trunking to join the meeting via a calling-in method. The audio broker server 135 may manage sessions across a plurality of (e.g. all) participants. After a meeting, the audio broker server 135 may store its recordings in the file system. The audio broker server 135 may then process these recordings in the background, and generate analytics in the analytics module 136 by partitioning the recordings into 'audio snippets' which correspond to periods (e.g. time slices) of the meeting with high engagement or 'memorable moments' (e.g. significant time slices). For example, the significant time slices may be determined by computing the engagement value per time slice (e.g. one minute slice) using the number of interaction inputs (e.g. like, clarify, agree, disagree, dislike inputs, or comments) for the respective time slice. The engagement values may then be normalized against the whole meeting's interactions and comments, and audio snippets for time slices (e.g. significant time slices) with values above a threshold (e.g. 0.3) may be generated. The generated audio snippets may then be stored in the database 137, and may be retrievable via the endpoints of the web server 134 and may be provided in the summary page of the application layer 131.

As described above, the example embodiments may be used to complement any existing online communication channels, regardless of how they have been designed. The example embodiment may help participants to be more engaged with the meeting and reflect the psychological experience after the meeting, which has not been provided by any existing systems. The example embodiments provide a visualization of psychological experience of the meeting participants in real-time. The example embodiments help especially remote meeting participants to understand the meeting atmosphere. The example embodiments may allow meeting participants to reflect on the most memorable moments of a meeting through replaying the audio snippets in the summary. This allows the meeting participants to reflect on the key points addressed in the meeting (liked or required clarifications by others), and also facilitates the meeting presenter/organizer to refine his meeting presentation/notes for future meetings. The example embodiments also assesses the empathy levels of various meeting moments.

Figure 14:
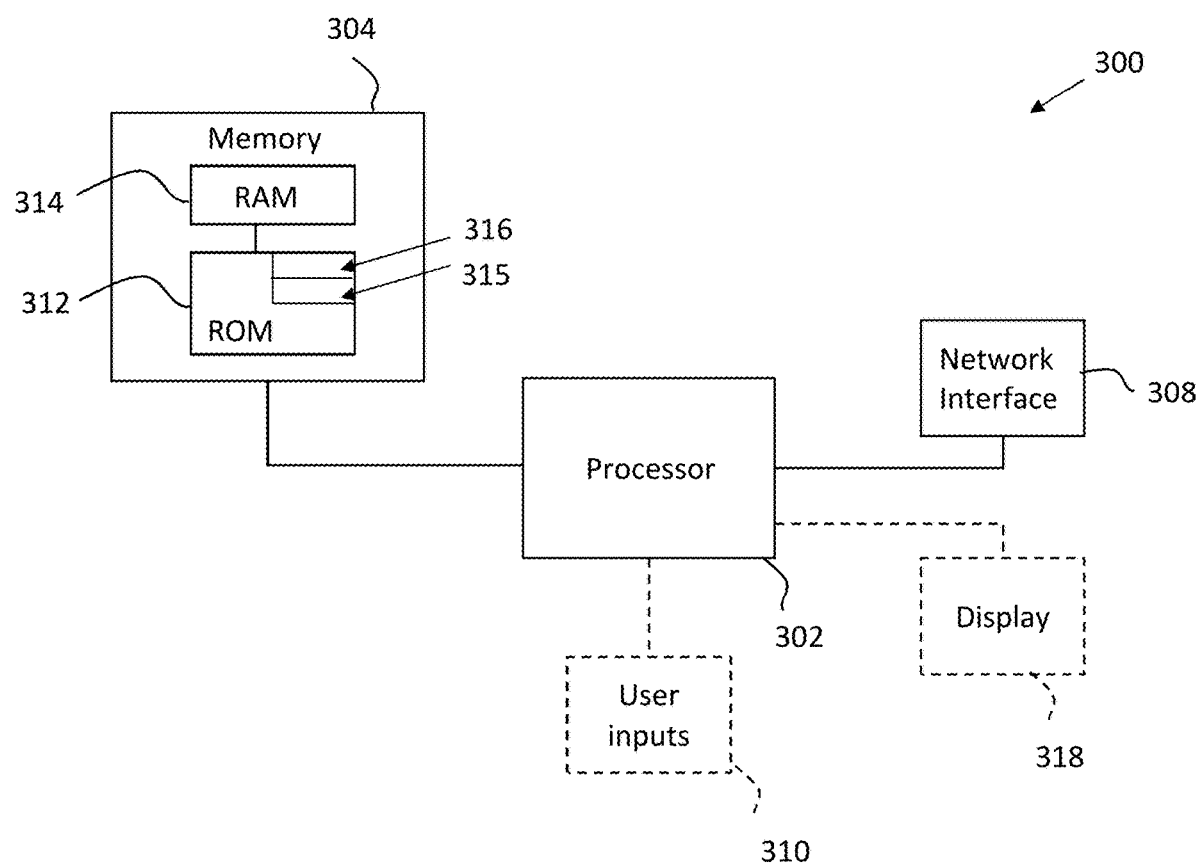
FIG. 14 is a block diagram of a system in accordance with an example embodiment.

For completeness, FIG. 14 is a schematic diagram of components of one or more of the example embodiments described previously, which hereafter are referred to generically as a processing system 300. The processing system 300 may, for example, be the apparatus referred to in the claims below.

The processing system 300 may have a processor 302, a memory 304 coupled to the processor and comprised of a RAM 314 and a ROM 312, and, optionally, a user input 310 and a display 318. The processing system 300 may comprise one or more network/apparatus interfaces 308 for connection to a network/apparatus, e.g. a modem which may be wired or wireless. The interface 308 may also operate as a connection to other apparatus such as device/apparatus which is not network side apparatus. Thus, direct connection between devices/apparatus without network participation is possible.

The processor 302 is connected to each of the other components in order to control operation thereof.

The memory 304 may comprise a non-volatile memory, such as a hard disk drive (HDD) or a solid state drive (SSD). The ROM 312 of the memory 304 stores, amongst other things, an operating system 315 and may store software applications 316. The RAM 314 of the memory 304 is used by the processor 302 for the temporary storage of data. The operating system 315 may contain code which, when executed by the processor implements aspects of the algorithms 30, 40, 82, and 90 described above. Note that in the case of small device/apparatus the memory can be most suitable for small size usage i.e. not always a hard disk drive (HDD) or a solid state drive (SSD) is used.

The processor 302 may take any suitable form. For instance, it may be a microcontroller, a plurality of microcontrollers, a processor, or a plurality of processors.

The processing system 300 may be a standalone computer, a server, a console, or a network thereof. The processing system 300 and needed structural parts may be all inside device/apparatus such as IoT device/apparatus i.e. embedded to very small size In some example embodiments, the processing system 300 may also be associated with external software applications. These may be applications stored on a remote server device/apparatus and may run partly or exclusively on the remote server device/apparatus. These applications may be termed cloud-hosted applications. The processing system 300 may be in communication with the remote server device/apparatus in order to utilize the software application stored there.

Figure 15A:
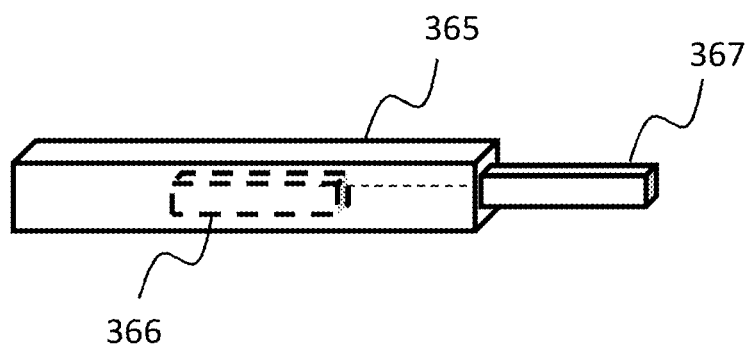
FIGS. 15A and 15B show tangible media, respectively a removable non-volatile memory unit and a compact disc (CD) storing computer-readable code which when run by a computer perform operations according to embodiments.
Figure 15B:
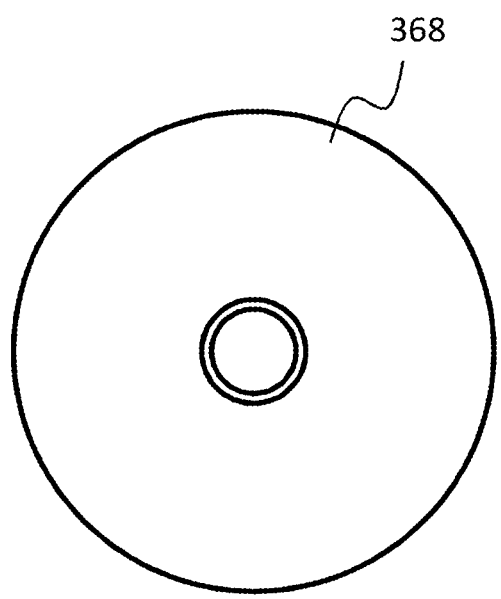

FIGS. 15A and 15B show tangible media, respectively a removable memory unit 365 and a compact disc (CD) 368, storing computer-readable code which when run by a computer may perform methods according to example embodiments described above. The removable memory unit 365 may be a memory stick, e.g. a USB memory stick, having internal memory 366 storing the computer-readable code. The internal memory 366 may be accessed by a computer system via a connector 367. The CD 368 may be a CD-ROM or a DVD or similar. Other forms of tangible storage media may be used. Tangible media can be any device/apparatus capable of storing data/information which data/information can be exchanged between devices/apparatus/network.

Embodiments of the present invention may be implemented in software, hardware, application logic or a combination of software, hardware and application logic. The software, application logic and/or hardware may reside on memory, or any computer media. In an example embodiment, the application logic, software or an instruction set is maintained on any one of various conventional computer-readable media. In the context of this document, a "memory" or "computer-readable medium" may be any non-transitory media or means that can contain, store, communicate, propagate or transport the instructions for use by or in connection with an instruction execution system, apparatus, or device, such as a computer.

Reference to, where relevant, "computer-readable medium", "computer program product", "tangibly embodied computer program" etc., or a "processor" or "processing circuitry" etc. should be understood to encompass not only computers having differing architectures such as single/multi-processor architectures and sequencers/parallel architectures, but also specialised circuits such as field programmable gate arrays FPGA, application specify circuits ASIC, signal processing devices/apparatus and other devices/apparatus. References to computer program, instructions, code etc. should be understood to express software for a programmable processor firmware such as the programmable content of a hardware device/apparatus as instructions for a processor or configured or configuration settings for a fixed function device/apparatus, gate array, programmable logic device/apparatus, etc.

If desired, the different functions discussed herein may be performed in a different order and/or concurrently with each other. Furthermore, if desired, one or more of the above-described functions may be optional or may be combined. Similarly, it will also be appreciated that the flow diagram of FIGS. 3, 4, 8 and 9 are examples only and that various operations depicted therein may be omitted, reordered and/or combined.

It will be appreciated that the above described example embodiments are purely illustrative and are not limiting on the scope of the invention. Other variations and modifications will be apparent to persons skilled in the art upon reading the present specification.

Moreover, the disclosure of the present application should be understood to include any novel features or any novel combination of features either explicitly or implicitly disclosed herein or any generalization thereof and during the prosecution of the present application or of any application derived therefrom, new claims may be formulated to cover any such features and/or combination of such features.

Although various aspects of the invention are set out in the independent claims, other aspects of the invention comprise other combinations of features from the described example embodiments and/or the dependent claims with the features of the independent claims, and not solely the combinations explicitly set out in the claims.

It is also noted herein that while the above describes various examples, these descriptions should not be viewed in a limiting sense. Rather, there are several variations and modifications which may be made without departing from the scope of the present invention as defined in the appended claims.

The invention claimed is:

1. An apparatus comprising:
at least one processor; and
at least one memory including computer program code;
the at least one memory and the computer program code configured to, with the at least one processor, cause the apparatus to:
provide a plurality of interaction elements to one or more participants of a virtual meeting, wherein the plurality of interaction elements enable the one or more participants to indicate at least one of an emotion, a request for clarification, a comment, an answer to a survey, or an indication of an experience at a particular time slice of the virtual meeting;
receive a plurality of interaction inputs, responsive to the one or more participants interacting with one or more of the plurality of interaction elements during the virtual meeting, wherein each of the plurality of interaction inputs is associated with one or more of a plurality of time slices of the virtual meeting;
determine one or more significant time slices from the plurality of time slices of the virtual meeting based, at least partially, on one or more of the plurality of interaction inputs;
generate a summary of the virtual meeting, wherein the summary comprises a timeline visualization of the virtual meeting having an associated plurality of corresponding time slices of the virtual meeting, such that a timeline input provided to the timeline visualization causes play back of a respective time slice corresponding to a position of the timeline input relative to a length of the timeline visualization, and wherein the timeline visualization comprises one or more user selectable graphical representations of at least one of audio data or video data in respective positions relative to the length of the timeline visualization and corresponding to at least one of the one or more significant time slices determined based on at least the one or more of the plurality of the interaction inputs received during the virtual meeting; and
in response to user selection of a respective one of the one or more graphical representations of the at least one of the audio data or the video data in the timeline visualization, cause play back of the at least one of the audio data or the video data that corresponds with a respective one of the one or more significant time slices.

2. The apparatus as claimed in claim 1, wherein determining the one or more significant time slices is based, at least partially, on whether a number of received interaction inputs for a respective time slice is above a first threshold, and wherein the first threshold is pre-determined or dynamically determined.

3. The apparatus as claimed in claim 2, wherein the at least one memory and the computer program code are configured to, with the at least one processor, cause the apparatus at least to:
generate the audio data corresponding to the one or more significant time slices when the number of interaction inputs for the respective one or more time slices is above a second threshold, wherein the second threshold is different from the first threshold.

4. The apparatus as claimed in claim 2, wherein the first threshold is determined based at least on a percentage of a total number of participants of the virtual meeting.

5. The apparatus as claimed in claim 1, wherein the audio data comprises audio data for a time window starting before a significant time slice corresponding to the audio data and/or finishing after the significant time slice corresponding to the audio data.

6. The apparatus as claimed in claim 1, wherein the at least one memory and the computer program code are configured to, with the at least one processor, cause the apparatus at least to:
determine at least one of an empathy score or an integrative complexity score for at least some of the one or more significant time slices.

7. The apparatus as claimed in claim 1, wherein the one or more selected time slices are selected based on a current time or are selected based on one or more respective timeline inputs.

8. An apparatus comprising:
at least one processor; and
at least one memory including computer program code;
the at least one memory and the computer program code configured to, with the at least one processor, cause the apparatus to:
provide a plurality of interaction elements to a first participant participating in a virtual meeting, wherein the plurality of interaction elements enable the first participant to indicate at least one of an emotion, a request for clarification, a comment, an answer to a survey, or an indication of an experience at a particular time slice of the virtual meeting, and wherein the virtual meeting comprises one or more participants;
provide, to the first participant, a summary of the virtual meeting, wherein the summary comprises a timeline visualization of the virtual meeting having an associated plurality of corresponding time slices of the virtual meeting, such that a timeline input provided to the timeline visualization causes play back of a respective time slice corresponding to a position of the timeline input relative to a length of the timeline visualization, and wherein the timeline visualization comprises at least one or more user selectable visual or graphical representations of at least one of audio data or video data in respective positions relative to the length of the timeline visualization and corresponding to at least some of one or more significant time slices determined based on at least the one or more of the plurality of the interaction inputs received during the virtual meeting, wherein the one or more significant time slices are determined based, at least partially, on one or more of a plurality of interaction inputs associated with the one or more participants; and
in response to user selection of a respective one of the one or more representations of the at least one of the audio data or the video data in the timeline visualization, cause play back of the at least one of the audio data or the video data that corresponds with the respective one of the one or more significant time slices.

9. The apparatus as claimed in claim 8, wherein the one or more selected time slices are selected based on a current time or are selected based on one or more respective timeline inputs from the first participant.

10. The apparatus as claimed in claim 8, wherein the plurality of interaction input elements enabling the first participant to indicate the emotion indicate one or more of: like, dislike, agree, or disagree
and wherein the answer to the survey relates to an experience during the virtual meeting.

11. The apparatus as claimed in claim 8, wherein the at least one memory and the computer program code are configured to, with the at least one processor, cause the apparatus at least to:
provide at least one of an empathy score or an integrative complexity score for at least some of the one or more significant time slices.

12. A method comprising:
providing a plurality of interaction elements to a first participant participating in a virtual meeting, wherein the plurality of interaction elements enable the first participant to indicate at least one of an emotion, a request for clarification, a comment, an answer to a survey, or an indication of an experience at a particular time slice of the virtual meeting, and wherein the virtual meeting comprises one or more participants;
providing, to the first participant, a summary of the virtual meeting, wherein the summary comprises a timeline visualization of the virtual meeting having an associated plurality of corresponding time slices of the virtual meeting such that a timeline input provided to the timeline visualization causes play back of a respective time slice corresponding to a position of the timeline input relative to a length of the timeline visualization, and wherein the timeline visualization comprises at least one or more user selectable visual or graphical representations of at least one of audio data or video data in respective positions relative to the length of the timeline visualization and corresponding to at least some of one or more significant time slices determined based on at least the one or more of the plurality of the interaction inputs received during the virtual meeting, wherein the one or more significant time slices are determined based, at least partially, on one or more of a plurality of interaction inputs associated with the one or more participants; and
in response to user selection of a respective one of the one or more representations of the at least one of the audio data or the video data in the timeline visualization, causing play back of the at least one of the audio data or the video data that corresponds with the respective one of the one or more significant time slices.

13. The method as claimed in claim 12, further comprising:
providing, to the first participant, an empathy score and/or an integrative complexity score for at least some of the one or more significant time slices.

14. A non-transitory computer readable medium comprising program instructions stored thereon for performing at least the following:
provide a plurality of interaction elements to one or more participants of a virtual meeting, wherein the plurality of interaction elements enable the one or more participants to indicate at least one of an emotion, a request for clarification, a comment, an answer to a survey, or an indication of an experience at a particular time slice of the virtual meeting;
receive a plurality of interaction inputs, responsive to the one or more participants interacting with one or more of the plurality of interaction elements during the virtual meeting, wherein each of the plurality of interaction inputs is associated with one or more of a plurality of time slices of the virtual meeting;
determine one or more significant time slices from the plurality of time slices of the virtual meeting based, at least partially, on one or more of the plurality of interaction inputs;
generate a summary of the virtual meeting, wherein the summary comprises a timeline visualization of the virtual meeting having an associated plurality of corresponding time slices of the virtual meeting, such that a timeline input provided to the timeline visualization causes play back of a respective time slice corresponding to a position of the timeline input relative to a length of the timeline visualization, and wherein the timeline visualization comprises one or more user selectable visual or graphical representations of at least one of audio data or video data in respective positions relative to a length of the timeline visualization and corresponding to at least one of the one or more significant time slices determined based on at least the one or more of the plurality of the interaction inputs received during the virtual meeting; and in response to user selection of a respective one of the one or more representations of the at least one of the audio data or the video data in the timeline visualization, cause play back of the at least one of the audio data or the video data that corresponds with a respective one of the one or more significant time slices.

15. The apparatus as claimed in claim 8, wherein the plurality of interaction input elements enable the first participant to indicate inputs relating to environmental conditions experienced by the first participant during the virtual meeting.

16. The apparatus as claimed in claim 1, wherein the plurality of interaction input elements enabling the one or more participants to indicate the emotion indicate one or more of: like, dislike, agree, or disagree;

and wherein the answer to the survey relates to an experience during the virtual meeting.

17. The method as claimed in claim 12, wherein the plurality of interaction input elements enabling the first participant to indicate the emotion indicate one or more of: like, dislike, agree, or disagree;

and wherein the answer to the survey relates to an experience during the virtual meeting.

18. The non-transitory computer readable medium comprising program instructions as claimed in claim 14, wherein the plurality of interaction input elements enabling the one or more participants to indicate the emotion indicate one or more of: like, dislike, agree, or disagree;

and wherein the answer to the survey relates to an experience during the virtual meeting.

* * * * *

UNITED STATES PATENT AND TRADEMARK OFFICE
CERTIFICATE OF CORRECTION

PATENT NO. : 11,616,657 B2
APPLICATION NO. : 17/213035
DATED : March 28, 2023
INVENTOR(S) : Marios Constantinides et al.

It is certified that error appears in the above-identified patent and that said Letters Patent is hereby corrected as shown below:

In the Claims

In Column 20, Line 17, Claim 12, delete "meeting" and insert -- meeting, --, therefor.

Signed and Sealed this
Eleventh Day of July, 2023

Katherine Kelly Vidal
Director of the United States Patent and Trademark Office